United States Patent [19]

Goodnight, Jr. et al.

[11] 4,088,795
[45] May 9, 1978

[54] LOW CARBOHYDRATE OILSEED LIPID-PROTEIN COMESTIBLE

[75] Inventors: Kenneth C. Goodnight, Jr.; Grant H. Hartman, Jr., both of Evansville, Ind.

[73] Assignee: Mead Johnson & Company, Evansville, Ind.

[21] Appl. No.: 743,246

[22] Filed: Nov. 19, 1976

[51] Int. Cl.² .................... A23C 11/00; A23J 3/00; A23L 1/20
[52] U.S. Cl. .................... 426/598; 426/629; 426/632; 426/634; 426/656; 260/123.5
[58] Field of Search .............. 426/615, 629, 634, 656, 426/489, 271, 598, 632; 210/23 H, 23 F; 260/123.5

[56] References Cited

U.S. PATENT DOCUMENTS

| | | | |
|---|---|---|---|
| 3,288,614 | 11/1966 | Miles | 426/598 X |
| 3,622,556 | 11/1971 | O'Connor | 260/123.5 |
| 3,653,912 | 4/1972 | Koski et al. | 260/123.5 X |
| 3,728,327 | 4/1973 | Frazeur et al. | 426/656 X |
| 3,732,395 | 1/1956 | Booley et al. | 260/461 |
| 3,736,147 | 5/1973 | Iacobucci et al. | 426/271 X |
| 3,809,771 | 5/1974 | Mustakas | 426/598 |
| 3,901,978 | 8/1975 | Nelson et al. | 426/656 |
| 3,993,636 | 11/1976 | Maubois et al. | 260/123.5 |
| 3,995,071 | 11/1976 | Goodnight, Jr. et al. | 426/598 |

*Primary Examiner*—Raymond N. Jones
*Assistant Examiner*—R. A. Yoncoskie
*Attorney, Agent, or Firm*—R. E. Carnahan; R. H. Uloth

[57] ABSTRACT

An oilseed lipid-protein product adapted for food use is prepared by aqueous extraction of fat containing oilseed materials including the ground raw oilseed or full-fat oilseed flour or flake at a pH in excess of the isoelectric range of the protein for the purpose of solubilizing the protein. Insoluble material is removed by centrifugation or filtration, and soluble carbohydrate is removed from the resulting lipid-protein emulsion by membrane filtration.

33 Claims, No Drawings

LOW CARBOHYDRATE OILSEED LIPID-PROTEIN COMESTIBLE

FIELD OF THE INVENTION

This invention is concerned with seed protein isolation and utilization. An oilseed fat containing protein product is produced.

DESCRIPTION OF THE PRIOR ART

The prior art has dealt extensively with the subject of isolation, purification and improvement of the nutritional quality and flavor of oilseed protein and particularly soybean protein for the purpose of adapting these plentiful and inexpensive proteins for human consumption. Soybean protein in its native state is unpalatable and has impaired nutritional quality due to the presence of antinutritional factors which interfere with mineral absorption and protein digestion. Other oilseed proteins suffer from similar disadvantages including the presence of toxic principles.

The prior art has dealt with the treatment and formulation of sources of these proteins in their native state such as the whole bean or seed and flours prepared therefrom to prepare palatable and digestible beverages, concentrates, or dried forms thereof which may be used to fortify other foods. The prior art has also dealt with the isolation and purification of these proteins for use as food ingredients.

The following patents deal with the preparation of whole bean oilseed lipid-protein beverages.

C. P. Miles, "Process for Producing Milk From Soybeans", U.S. Pat. No. 3,288,614, patented Nov. 29, 1966. Soy milk is prepared by cracking and dehulling of the soybeans, and passage thereof through flaking rolls under heavy pressure; suspension of the soy flakes in water followed by the addition of a phosphate or sequestering agent stabilizer; pressure cooling; homogenizing; clarifying in a centrifugal separator and formulating with other ingredients to prepare a milk-like product.

A. I. Nelson, et al. "Soybean Beverage and Process", U.S. Pat. No. 3,901,978 patented Aug. 26, 1975. The process involves soaking whole soybeans to tenderize them; boiling with dilute sodium bicarbonate solution to inactivate trypsin inhibitor and the lipoxigenase enzymes; wet grinding; and homogenizing to form a bland stable aqueous dispersion of whole soybeans.

The following patents are concerned with the preparation of purified oilseed proteins for food use and involve membrane filtration of extracts containing the protein and carbohydrate constituents of the oilseed in solution. Each of these processes is distinguished from the foregoing in that defatted oilseed raw materials are employed and a fat free purified protein isolate is the end product.

Iacobucci, et al., U.S. Pat. No. 3,736,147 patented May 29, 1973 disclose an ultrafiltration process for the preparation of soy protein isolate having a reduced phytic acid content which involves various chemical treatments in combination with extensive ultrafiltration. Chemical treatment involves either enzymatic hydrolysis of the phytic acid by the enzyme phytase at neutral pH prior to ultrafiltration, ultrafiltration in the presence of calcium ion at low pH, or the use of ethylenediaminetetraacetic acid at a high pH.

Frazeur, et al., U.S. Pat. No. 3,728,327 patented Apr. 17, 1973 disclose a membrane separation process for preparation of a soy protein isolate which requires homogenization of a soybean slurry followed by centrifugation and extensive reverse osmosis or ultrafiltration of a highly dilute solution followed by spray drying of the retentate.

O'Connor, U.S. Pat. No. 3,622,556 patented Nov. 23, 1971 is concerned with the preparation of a sunflower meal protein isolate which involves removing green color forming precursors from the protein by ultrafiltration.

One of the chief disadvantages of the liquid soy lipid-protein products produced by the Miles or Nelson, et al. methods is that the soluble soybean carbohydrates are retained in the end product. These carbohydrates are not fully digestible by human beings and are responsible for flatulence and other digestive disturbances following consumption thereof. The prior art has not addressed the possibility of adapting the membrane filtration techniques represented in the Iacobucci, et al., Frazeur, et al., and O'Connor patents to the elimination of soluble carbohydrates from the liquid soy lipid-protein products of the sort illustrated in the other patents cited.

SUMMARY OF THE INVENTION

The invention concerns a membrane filtration process for the elimination of soluble carbohydrate from an aqueous oilseed lipid-containing suspension or emulsion containing dissolved and/or suspended protein, and dissolved carbohydrate. The emulsion is prepared by aqueous extraction of a fat-containing particulate oilseed raw material at a pH in excess of the isoelectric range of the oilseed protein. The ground whole bean or seed may be employed or a fat-containing flour prepared from the oilseed is suitable. Mixtures of full fat and defatted flours may be used. The emulsion after removal of particulate material by filtration or centrifugation is purified by membrane filtration.

In one preferred form of the process, extraction of the oilseed material at a pH in excess of pH 10.1 and preferably pH 11-12 followed by centrifugation results in substantial elimination of phytic acid components from the resulting product. In a further preferred form, high-temperature short-time heat treatment is applied to the emulsion-containing suspended lipid materials either prior to or after membrane filtration which results in an improvement in the nutritional quality and functionality with respect to shelf stability and physical characteristics of products formulated from the novel product.

Oilseeds useful in the invention include chickpea, rapeseed, coconut, cottonseed, peanut, safflower seed, sesame seed, soybean, and sunflower seed. Soybean is considered representative of these oilseeds and is used for the purpose of illustration in this disclosure. Other seeds containing substantial amounts of protein and oil can be treated in a manner similar to that described below with modifications which will be within the knowledge of those skilled in the art. Soybean is the preferred oilseed for application of the present invention.

DETAILED DESCRIPTION OF THE INVENTION

RAW MATERIALS AND PRETREATMENT

Ground whole soybeans are the preferred starting material for the present invention. Ground dehulled beans may be employed, but there is no advantage since insoluble material and soluble carbohydrates are removed at later stages of the process and the presence of the hulls does not burden these removal steps. Grinding may be accomplished in the dry state or wet grinding of a water suspension of the beans may be employed. It is preferred to employ temperatures in excess of about 10° C. in the interest of securing the optimal protein quality and extraction yields with efficient phytate removal when the latter is sought. Excessive heating of the particulate soybean material prior to extraction appears to reduce the solubility of the protein and form an alkali-stable bond between the phytate components and other alkali-soluble soybean constituents, probably proteins, which reduces the efficiency of phytate removal as is described below.

If desired, the beans may be blanched prior to grinding but, if this is done, the heating period should be limited and blanching should be conducted in such a way as to avoid a decrease in protein yield. Similarly, commercial full fat soy flour may be employed as raw material, but again it is preferred to select a flour which has not been heated since this reduces the efficiency of protein extraction and phytate removal as has been mentioned. Mixtures of fat-containing and defatted flours may be used. Blanching of the whole bean and wet grinding is believed to improve the organoleptic qualities of the product resulting from the present invention.

When a low phytate product is desired as is the case according to a preferred embodiment of the invention, the particulate soybean raw material should not have been previously treated with acid. Contact of the native soybean protein with acid in the presence of the phytic acid constituents of the bean results in the formation of an alkali-stable bond which reduces the efficiency of the method described below for elimination of the phytic acid constituents. Accordingly, particulate soybean materials such as acid precipitated soybean concentrates which are prepared by extraction of soluble carbohydrates from soybean material with acid at the isoelectric value of the soy protein are not suitable starting materials.

STEP (a) FORMATION OF AN AQUEOUS SUSPENSION OF SOYBEAN LIPID

The suspension is formed at a pH in excess of the isoelectric value of the soy protein employing one of the lipid containing particulate soybean materials referred to above. The particular pH selected for this stage of the process depends on the type of product being sought. From the standpoint of maintaining maximum protein quality, pH 7-9 is preferred and, in any event, a pH of less than 10. Within this pH range of from the isoelectric value to pH 10, the phytic acid constituents are soluble and are carried through the process with the protein. If it is desired to eliminate the phytic acid constituents, the suspension in step (a) is formed at a pH of pH 10.1 to pH 14 within which range the phytates are rendered insoluble and are separated with other insoluble constituents in a subsequent step.

Ordinarily, from 4 to 40 parts by weight of water or aqueous alkaline solution per part by weight of particulate soybean material is employed for extraction. Preferably from 8 to 16 parts by weight of water or aqueous solution are employed. Sodium hydroxide, potassium hydroxide, or other nontoxic water soluble base which is suitable for food use and which is compatible with the soy protein may be used for basification. Alkaline earth metal hydroxides such as barium hydroxide or calcium hydroxide under some conditions of use cause precipitation of the soy protein and are not preferred. If the objective is to secure maximum recovery of protein in the extract, relatively large amounts of extract water or alkaline solution are employed and the solids may be removed by centrifugation and re-extracted. Where residual solids are to be used for animal feed, it may be desirable to conduct a less thorough extraction or to omit washing of the solids after removal of the supernatant liquid. Similarly, times and temperatures are varied to suit the particular operating purposes and equipment, but it is preferred to limit the exposure at highly alkaline pH values such as pH 12 or more to no more than 25° C. for 2 hrs in order to avoid chemical degradation of the protein.

Where it is desired to eliminate the phytic acid constituents and obtain a soybean lipid protein product which is low in both carbohydrate and phytic acid components, the suspension should be formed in step (a) at a pH in the range of 10.1 to 14, preferably pH 11-12, and more preferably pH 11.4-11.8. This results in disruption of the soluble phytic acid soy protein association and insolubilizes the phytates. When the terms phytate or phytates are used herein, it is intended to include salts of phytic acid or molecular complexes of phytic acid with other soybean constituents. After the phytates are rendered insoluble at pH 10.1-14, the phytates are separated by conventional solid separation techniques such as centrifugation or filtration in a subsequent step of the process.

As to the alkaline treatment in step (a), it has been found that the phytate content of the extract drops abruptly at pH's in excess of pH 10.1. At pH 10.6 an extract is produced having a phytate content of about 1 g./100 g. of solids in the extract. At pH 11.0 the phytate content of the extract is about 0.05 g./100 g. of solids in the extract. When reference is made herein to a "low phytate" product, what is intended is one having less than 0.5 g. phytate per 100 g. of solids, and preferably less than 0.3 g. phytate per 100 g. of solids. As the pH is increased, the tendency to hydrolyze the protein and effect condensation through the sulfur containing amino acids increases. While phytate removal takes place at all pH values in excess of pH 10.1, it is more efficient at pH values in excess of pH 11.0. It is preferred to operate in the range of about pH 11-12, and more preferably at pH 11.4-11.8 to avoid as much as possible a loss in protein quality due to hydrolysis or condensation of sulfur-containing amino acids, and still effect efficient removal of phytate.

The temperature during phytate separation following alkaline treatment should preferably be at least 10° C., for instance 10° C. to 50° C. or 15° C. to 30° C. It has been found that removal of phytate is incomplete but, nevertheless, significant at 10° C. or lower following alkaline treatment at pH 11-12. At 10° C. approximately one-half of the phytate is removed, while at 20° C. 90% of the phytate is removed, and at 30° C. more than 99% removal is effected. The foregoing temperature ranges are the optimum values for dissociation of the soluble soy protein phytic acid complex and for rendering of the phytates and phytic acid derivatives insoluble. Under some manufacturing conditions, however, other temperatures ranges may prove to be more suitable since the temperature at which the phytate precipitate is formed has an effect on the physical nature thereof which affects its filtration and centrifugation characteristics. Empirical selection of the optimum phytate insolubilization temperature for any given manufacturing arrangement is desirable. Optimum values usually fall within the range of 15° C. to 30° C. At temperatures in excess of 50° C. the tendency for hydrolysis of the protein, and for the formation of undesirable protein reaction products increases, the higher temperatures are thus to be avoided.

The time of exposure of the soy protein containing extract to aqueous base in the range of pH 10.6-14 during phytate precipitation should be limited according to the temperature employed so that substantial loss in protein quality does not occur. A convenient way to ascertain this is to determine the cysteine content of the protein since cysteine is the most sensitive of the amino acids to loss from the soy protein under the alkaline conditions employed. It has been found that at pH 11 and at temperatures in the range of 20°-30° C. essentially no loss of cysteine occurs during periods of up to 6¾ hours. However, at pH 12, significant loss of cysteine occurs within 2¾ hours at 40° C. At 20° C. and pH 12 the loss of cysteine is not believed to be significant during 2¾ hours, but after 6¾ hours, approximately 15% of the cysteine is lost. Accordingly, a period of up to about ½ hour for phytate precipitation is recommended, but longer periods are satisfactory when operating at the lower end of the pH range of about pH 11. At pH values of 12 and higher careful limitation of the time of exposure to the alkaline medium should be exercised by monitoring the content of the amino acid cysteine.

In summary, the duration of exposure of the alkaline aqueous extract of soybean material in the range of pH 10.6-14 for the purpose of phytate precipitation should be chosen so that under the conditions of pH and temperature employed the duration of exposure is such that not more than about 10% of the cysteine of the soy protein containing extract is destroyed. Treatment conditions resulting in substantially more cysteine destruction than 10% are regarded as inappropriate since one of the objects of the present invention is to provide a soy protein of improved nutritional quality which purpose is defeated by degradation of the soy protein and loss of certain amino acid values, particularly cysteine.

STEP (b) SEPARATION OF PARTICULATE MATERIAL

Step (b) involves separation of the spent flakes and of the insolubilized phytate when the process is operated in such a manner as to insolubilize phytate from the extract. There is obtained an aqueous emulsion of suspended lipid material which may contain suspended protein, as well as dissolved protein, and dissolved carbohydrate. Conventional solid separation unit processes may be employed such as centrifugation. The same constraints on time, temperature and pH which are applicable during formation of the extract in step (a) are applicable during separation of the particulate material in step (b).

The aqueous emulsion of soybean lipid from which particulate material has been removed is most convenient for further processing if it contains from 1-12% by weight of protein, 1-10% by weight of carbohydrate and associated mineral constituents which are dissolved during the extraction process. If extracts are prepared containing more than 12% by weight of protein, they are generally viscous and both inconvenient to handle and inefficiently processed in the centrifugation or filtration and washing steps.

In one preferred mode of operation, the emulsion produced in step (b) is subjected to high-temperature short-time heat treatment at a pH of less than pH 10 but greater than the isoelectric value of the soy protein, for instance pH 6-10, and preferably pH 7.0. A temperature in the range of from 60° C. and 150° C. for a period of from 1 sec. to 30 min. is employed. The selection of the proper combination of time and temperature is discussed in more detail below. Heat treatment at this stage has the benefit of increasing the ultrafiltration flux rate in step (c) and of reducing the microbial population sufficiently to eliminate spoilage during the ultrafiltration step.

STEP (c) CARBOHYDRATE SEPARATION

Filtration in step (c) is preferably carried out using a so-called ultrafiltration apparatus containing a semi-permeable membrane which will retain protein constituents, and allow dissolved lower molecular weight materials to pass. Semi-permeable membranes having the capability of retaining proteins having a minimum molecular weight in the range of about 10,000-50,000 daltons are useful. The apparatus is operated at a gauge pressure of about 25 psig but pressures in the range of about 15 to 100 psig and higher are useful. Ultrafiltration according to the present invention is to be distinguished from other membrane filtration processes in respect of the porosity of the membrane employed and the pressure maintained on the retentate to force passage of excess water and low molecular weight ingredients. Reverse osmosis processes, for example, use membranes having much lower porosity and retain much lower molecular weight materials such as the carbohydrate constituents of the soybean which it is desired to eliminate by the present process. Reverse osmosis processes are also considerably more expensive to operate in that higher operating pressures and generally lower flux rates are involved.

We have made the surprising discoveries that the presence of suspended or emulsified fat in the extract from which the carbohydrates are to be removed by ultrafiltration does not interfere with the efficiency of the ultrafiltration and that the suspended or emulsified fat remains in the retentate. Thus, it is possible to prepare a highly desirable nutritional product containing both fat and protein and little carbohydrate. The carbohydrates have long been known to be among the undesirable constituents of the soybean from the standpoint of human consumption.

Filtration employing a semi-permeable membrane is preferably carried out at a pH in the range of pH 6.5 to pH 7.5 for the purpose of maintaining protein integrity but this is not essential. At pH values in excess of pH 10 some filtration membranes may be subject to deterioration or damage and, furthermore, a loss in protein quality is more likely to occur. Therefore, it is preferred to conduct the membrane filtration step at a pH in the range of about pH 6-10, more preferred at pH 6.5 to pH 7.5, and, in any event, at a pH in excess of the isoelectric range of the protein.

The suspension which is subjected to ultrafiltration and the retentate during the ultrafiltration process is preferably maintained at a temperature in the range of about 45° C. to 75° C. to improve the flux rate and to minimize bacterial spoilage. With respect to the latter point, a temperature of at least about 60°-65° C. is preferred. Temperatures in excess of 75° C. are undesirable since chemical decomposition and condensation reactions of the protein occur with the formation of undesirable byproducts and loss in protein quality. Below about 60° C. pasteurization is less effective and spoilage may occur. Below about 45° C. the benefit to flux rate improvement diminishes.

It is preferred to produce a final liquid soy lipid-protein comestible having a protein concentration of about 3% to 7% by weight, but for some purposes lower or higher concentrations may be desirable. The protein concentration of the soy protein can be readily adjusted to any value in the range of 1% to 12% by weight by appropriate manipulation of volumes of extraction water, permeate collected, or evaporative concentration or dilution may be employed as long as the protein remains in solution. Protein solutions having concentrations of less than 1% by weight are uneconomical and of little practical interest. For instance, when commencing with a particle-free emulsion having a protein concentration of 3.5%, removal of half of the volume as permeate results in a retentate having a protein concentration of 7%. A substantial reduction in carbohydrate and mineral content occurs through elimination of these ingredients with the permeate water. Since the soybean carbohydrate substituents are generally undesirable nutritional ingredients due to their difficulty of digestion by man, it is desirable to eliminate a major proportion thereof.

We have expressed the carbohydrate content of the soybean lipid-protein comestibles prepared in our present studies as protein coefficient which is the ratio of the protein content thereof to the total of the protein and carbohydrate content. For infant formula use we prefer a protein coefficient of about 0.90 or more since the soybean carbohydrates cause flatulence and undesirable stools in infants subsisting on the soy protein based formula. Aqueous lipid-protein comestibles having protein coefficients of about 0.8 are suitable for the fortification of conventional foods such as meat and bread and for the preparation of liquid dietary products for more mature subjects.

It has been found that by concentration of a 3.5% by weight protein containing extract by ultrafiltration to one-half of its original volume that the retentate still contains an undesirably high proportion of carbohydrate for infant formula use. Such product is suitable for certain other food uses, however. We have found that diafiltration (a form of ultrafiltration in which the retentate is continuously diluted with water or a wash solution) is an appropriate way of eliminating additional undesired carbohydrate and mineral constituents. This amounts simply to continuously adding a diafiltration solution, preferably water, to the retentate as it is circulated through the filtration apparatus and permeate is removed. Diafiltration thus constitutes a washing operation in which the undesired low molecular weight constituents are washed from the retentate.

Referring to the original volume of particulate-free emulsion as one in a preferred form of the process, ½ volume of permeate is removed by ultrafiltration and then from ½ to 2½ volumes of water are used for dilution of the retentate during diafiltration until the total permeate collected is up to 3 volumes. Dilafiltration to provide a larger permeate volume affords little additional purification. Diafiltration may be commenced at a gradual rate near the beginning of the ultrafiltration, and the rate increased as the desired protein concentration is approached, or alternatively, concentration to the desired protein content may precede diafiltration.

Instead of water, diafiltration solutions containing desired ingredients for the final product, or which improve protein retention or flux rate may be employed. In the case of infant formula products, additional ingredients of the final formulated product which contain the present soy protein solution as a principle protein ingredient which may be combined therewith during the diafiltration stage include carbohydrate, fat, and mineral constituents. While this may offer an advantage in some instances, it is generally not a preferred mode of operation since at least a portion of these additives will be lost to the permeate by passage through the membrane. These losses can in part be offset by recovery of the desired ingredients from the permeate or by recycling the permeate to the diafiltration water.

A desirable adjunct to the process constituting an additional novel feature of the invention involves high-temperature short-time (HTST) heat treatment of the extract, and/or retentate, and/or of a liquid dietary product formed from the latter. This modification, constituting a preferred version of the present invention, has several purposes. When conducted prior to ultrafiltration, heat treatment has the benefit of reducing the bacterial count and minimizing the risk of spoilage of the clarified extract during further processing including ultrafiltration. It has the further benefit of facilitating the ultrafiltration step since it has been found that the flux rate at which permeate is formed during ultrafiltration is increased when the particulate-free emulsion is heated prior to ultrafiltration. High-temperature short-time heat treatment when used in conjunction with ultrafiltration to produce a lipid-protein comestible is considered part of the present invention as are the protein isolates produced thereby. The latter may be formulated as is with the protein in the dissolved state, or they may be dried.

From the standpoint of the utility of the aqueous lipid-protein comestible of the present invention in forming liquid dietary products such as infant formulas, milk substitutes, and meal replacements or supplements, heat treatment has the benefit of improving the nutritional quality of the protein, and of improving the functionality of the protein including a reduction of the viscosity of solutions thereof, and improvement in solubility and fat emulsification proterties. These benefits are derived whether heat treatment takes place before or after ultrafiltration.

The time and temperature conditions which are operable for the foregoing purposes do not lend themselves to precise definition, but those skilled in the milk treatment and soy protein extraction arts will have no difficulty in selecting optimum conditions for the particular manufacturing facilities which are available. Broadly speaking, the higher the temperature employed, the shorter the time of treatment with the maximum temperature presently considered applicable being about 150° C. for a period of 1 sec. When lower temperatures are employed, longer time periods of treatment are necessary for instance 60° C. for about 30 min. has substantially equivalent effect to 150° C. for 1 sec. Other suitable times and temperatures including 130° C. for 45–60 secs. and 100° C. for 10 min.

In one preferred mode of the short-term high-temperature heat treatment modification of the process, the heat treatment step is divided so that a relatively mild heat treatment is employed prior to ultrafiltration for the purpose of reducing spoilage and improving flux rate, and then a more severe heat treatment is employed on the finished soy protein retentate after removal of the carbohydrate constituents. This has the advantage of minimizing the browning reaction which results from an interaction of the soybean carbohydrate with the soy protein which has a tendency to occur when carbohydrate containing soy protein extracts are heated. For example, the clarified extract just prior to ultrafiltration may be given a mold heat treatment of from about 60° C. for 30 min. to 130° C. for 1 min., cooled to a temperature of about 45°–75° C. and then purified by ultrafiltration as is described above. The resulting aqueous purified soy protein solution retentate may be then given a further more severe heat treatment for the purpose of improving the functionality of the protein and destroying antinutritional factors. For this second heat treatment, a temperature in the range of about 110° C. for 1 min. up to about 150° C. for 1 sec. may be employed. The second heat treatment may be incorporated with subsequent process steps whereby a liquid dietary product is produced from the aqueous purified soy protein by combining other ingredients therewith.

The preferred heat treatment conditions for a given application of the process are determined empirically and adapted to the available equipment by evaluating the performance of the heated extract when heating is carried out for different time periods and at different temperatures. For some purposes, one set of heat treatment conditions may be preferred while another set may be preferable when the resulting aqueous purified soy protein solution is to be used for a different purpose. In any event, the conditions are selected to achieve one or more of the following results:

(i) improving the protein efficiency ratio of said lipid-protein comestible produced in step (c), or of a liquid dietary product prepared therefrom;

(ii) improving the functionality of said lipid-protein comestible produced in step (c) or of a liquid dietary product prepared therefrom as measured by sedimentation index, nitrogen solubility index, or emulsion stability index, (iii) increasing the ultrafiltration flux rate in step (c), or (iv) reducing the microbial population of said particulate free emulsion and said retentate sufficiently to substantially eliminate spoilage thereof during ultrafiltration in step (c).

For food applications, the liquid lipid-protein comestible produced as retentate according to the process described above may be dried by conventional methods including freeze-drying and spray-drying, and the dry powder used as a food ingredient. For the preparation of beverages such as soy milks, the retentate without drying is preferably combined with other desired ingredients such as carbohydrates, fats, vitamins, minerals, etc. and the composition homogenized and, if desired, canned and sterilized. The food products and beverages have improved nutritional value, stability, and functional qualities.

DESCRIPTION OF SPECIFIC EMBODIMENTS

EXAMPLE 1

Seed grade soybeans were ground twice in a hammermill employing a very slow feed rate to prevent the development of excessive heat to provide a coarse flour. The temperature of the flour at the end of each grinding period was 44° C. A suspension of 250 g. of the ground beans in 4 l of deionized water at room temperature was prepared in a vessel equipped for mechanical agitation and the pH of the suspension was adjusted to pH 9.0 by addition of 10% aqueous sodium hydroxide. The suspension was thoroughly mixed at this pH and at room temperature for 30 min. and the insoluble material was then separated by centrifugation at 4022 × G. The supernatant liquid was again transferred to the vessel equipped with the agitator and adjusted to pH 11.6 with 10% aqueous sodium hydroxide and mixing at room temperature was continued for another 30 min. period. The suspension was then centrifuged at 13,218 × G and the supernatant liquid comprising an emulsion of the soybean lipid-protein in a solution of soy protein and soy carbohydrate was subjected to ultrafiltration at 46° C. and 40 psi. employing a semi-permeable membrane capable of retaining proteins having molecular weights in excess of 30,000 daltons. The emulsion was concentrated by ultrafiltration to one-half of its original volume, and then further purified by diafiltration involving dilution of the concentrated retentate with deionized water at the same rate that permeate was being collected so as to maintain the volume of the retentate constant. A volume of diafiltration water equal to the original volume of the emulsion charged to the ultrafiltration apparatus was employed. The retentate was then freeze dried and analyzed. The results obtained are given in the following table along with the results of four other examples conducted in similar fashion but employing either different pH values and times for extraction or employing commercial full fat soy flour as raw material rather than ground whole soybean.

| | EXTRACTION CONDITIONS AND ANALYSES | | | |
|---|---|---|---|---|
| Ex. No. | Raw Material and Extraction Conditions | Protein Co-efficient | Protein Yields % | Phytic Acid (g./100 g. protein) |
| 1 | ground whole soybean pH 9.0, 30 min. centrifuge, retain supernatant pH 11.5, 30 min. | 0.96 | 76.5 | 0.23 |
| 2 | ground whole soybean pH 11.6, 60 min. | 0.95 | 79.8 | 0.002 |
| 3 | ground whole soybean pH 9.0, 60 min. | 0.95 | 80.4 | 1.59 |
| 4 | commercial full fat soy flour pH 9.0, 30 min. | 0.92 | 24.1 | |
| 5 | commercial full fat soy flour pH 9.0, 26 min. centrifuge, retain supernatant pH 11.6, 30 min. | 0.88 | 21.6 | |

The protein coefficient is a measure of the relative removal of carbohydrate and retention of protein by the membrane filtration step. The protein coefficient is the ratio of the protein content on a weight basis of the product to the sum of the protein content and carbohydrate content on a weight basis. Protein was determined by the method of Lowry, et al., Journal of Biological Chemistry, 193:265–275 (1951) and carbohydrate was determined by the method of Dubois, et al., Analytical Chemistry 28:350–356 (1956). Phytic acid was determined by the method of Wheeler, et al., Ceral Chemistry 48:312–320 (1971).

It is evident by comparison of the phytic acid composition of the products of Examples 1 and 2 with that of Example 3 that extraction at pH 11.6 results in substantial reduction or virtual elimination of phytic acid from the product. Phytic acid removal was unsuccessful in Example #5 and the protein yields in Examples 4 and 5 were both substantially lower than in Examples 1–3. Carbohydrate removal was good in all instances, however. Examples 4 and 5 employed commercial full fat soy flour as raw material which had been toasted by the manufacturer at about 65° C. for 20-30 min. Since the freshly ground whole bean raw material employed in Examples 1-3 was not toasted in this fashion, it is believed that heat treatment of the ground oilseed raw material prior to extraction is undesirable.

EXAMPLE 6

LIPID-PROTEIN COMESTIBLE FROM WET-GROUND WHOLE SOYBEANS

Soybeans, 625 g., were soaked in 10 l of distilled water at 50° C. for 1 hr. They were then transferred to a blender of the type having rotating knives borne on an axial shaft at the bottom of the container. The blender container had a capacity of 1 gal. and the grinding was carried out at 50° C. for 5 min. The warm solution was then cooled to room temperature, 20°-25° C. and adjusted to pH 11.7 with dilute aqueous sodium hydroxide. It was held at this value for 15 min. The pH of the freshly ground beans was pH 6.4 prior to pH adjustment. Insoluble material was then removed by centrifugation at 4000 × G. in a desludging centrifuge 20 min. The light liquid stream from which most of the particulate material had been removed was again centrifuged in a Sorvall SZ-14GK continuous flow through centrifuge head at 10,000 × G to remove further particulate material. The resulting emulsion of liquid material containing dissolved protein and dissolved carbohydrate at pH 11.3 was adjusted to pH 7.0 as it was collected. It was kept at 4° C. overnight and then purified by ultrafiltration. The particulate free emulsion has a volume of 7.9 l and contained 4.45% by weight of solids. Ultrafiltration was carried out with the same type of apparatus as is described in Example 1 until 3.95 l of permeate had been collected. Distilled water for diafiltration was then added to the retentate at the same rate as permeate was collected with diafiltration in this fashion being continued until a total of 11.97 kg. of permeate had been collected. The retentate weighed 4.59 kg. and contained 5.42% by weight of solids. On a dry basis, the following analytical results were obtained. The values given are the average of three samples with standard deviations reported.

| | |
|---|---|
| Protein (g./100 g. of solids) | 62.6 ± 0.379 |
| Fat (g./100 g. of protein) | 49.8 ± 12.4 |
| Ash (g./100 g. of protein) | 3.32 ± 0.153 |
| Phytic Acid (g./100 g. of protein) | 0.082 |

EXAMPLE 7

SOY MILK FROM WHOLE BEAN LIPID-PROTEIN

A batch of the lipid-protein comestible retentate prepared according to the method described in Example 6 weighing 2.08 kg. and having the analysis shown was combined in the liquid state with the following ingredients to yield a soy milk containing 3.30% by weight of protein, 3.50% by weight of fat, and 5.00% by weight of carbohydrate.

| Ingredient | Amount |
|---|---|
| Whole bean protein material, liquid (total solids, 6.76%; protein, 4.26%; fat, 2.10%; all by weight | 1080.00 g. |
| Soy oil | 47.04 g. |

-continued

| Ingredient | Amount |
|---|---|
| Corn syrup solids | 23.96 g. |
| Sucrose | 92.03 g. |
| Milk salts | 21.90 g. |
| Magnesium chloride hexahydrate | 2.11 g. |
| Carrageenan | 1.26 g. |
| Lecithin | 10.04 g. |
| Water, q.s. | 2511.20 g. |

All of the ingredients were combined except the lecithin and the soy oil. The mixture was then heated to 66° C. and the soy oil and lecithin mixture also heated to this temperature were added thereto and the mixture homogenized twice in a mechanical homogenizer at 3,000 psi. The homogeneous milk-like product was then bottled in 4 oz. nursing bottles and sterilized at 127° C. for 6 min. Samples were stored at room temperature. No difficulty in processing the formulation was encountered.

What is claimed is:

1. The process for preparing an oilseed lipid-protein comestible which comprises:
    (a) forming an aqueous suspension of edible oilseed containing suspended oilseed lipid, dissolved oilseed protein, and dissolved oilseed carbohydrate at a pH in excess of the isoelectric range of said protein, said suspension being obtained by aqueous extraction of particulate oilseed material containing lipid, protein, and carbohydrate at a pH in excess of the isoelectric range of said protein;
    (b) separating particulate material from said suspension to yield an emulsion containing suspended lipid, dissolved protein, and dissolved carbohydrate; and
    (c) separating carbohydrate from said emulsion by filtration employing a semi-permeable membrane which has the capability to retain suspended lipid and dissolved protein as retentate, and to pass dissolved carbohydrate as permeate.

2. The process of claim 1 wherein said oilseed is selected from the group consisting of chickpea, rapeseed, coconut, cottonseed, peanut, safflower seed, sesame seed, soybean, and sunflower seed.

3. The process of claim 1 wherein said oilseed is soybean.

4. The process of claim 3 wherein said particulate oilseed material in step (a) comprises ground soybean.

5. The process of claim 3 wherein said particulate oilseed material in step (a) comprises fat-containing soybean flour.

6. The process of claim 1 wherein said filtration employing a semi-permeable membrane in step (c) includes diafiltration.

7. The process of claim 6 wherein diafiltration is continued until said retentate has a protein coefficient of at least about 0.8.

8. The process of claim 6 wherein said diafiltration is continued until said retentate has a protein coefficient of at least about 0.9.

9. The process of claim 1 wherein said emulsion and said retentate in step (c) are maintained at a temperature within the range of about 45° C. to 75° C. during membrane filtration.

10. The process of claim 3 wherein said forming an aqueous suspension in step (a) and said separating particulate material in step (b) are conducted at a pH in excess of pH 10.1.

11. The process of claim 10 wherein steps (a) and (b) are carried out at a temperature in excess of about 10° C.

12. The process of claim 10 wherein steps (a) and (b) are carried out at a temperature in the range of about 15° C. to about 30° C.

13. The process of claim 10 wherein said pH is within the range of pH 11 to pH 12.

14. The process of claim 3 wherein said forming an aqueous suspension in step (a) and said separating particulate material in step (b) is conducted at pH 10 or less.

15. The process of claim 14 wherein said pH is within the range of pH 7-9.

16. The process of claim 3 wherein said filtration employing a semi-permeable membrane in step (c) is conducted within the range of pH 6.5 to pH 7.5.

17. The process of claim 3 wherein step (b) includes heating said emulsion at a temperature of from 60° C. to 150° C. for a period sufficient to:
 (i) improve the protein efficiency ratio of said lipid-protein comestible,
 (ii) improve the functionality of said lipid-protein comestible as measured by sedimentation index, nitrogen solubility index, or emulsion stability index,
 (iii) increase the ultrafiltration flux rate in step (c), or
 (iv) reduce the microbial population of said emulsion produced in step (b) sufficiently to substantially eliminate spoilage thereof during filtration employing a semi-permeable membrane in step (c) said emulsion having a pH in excess of the isoelectric value of said protein but less than pH 10 during said heating.

18. The process of claim 17 wherein said period is from 1 sec. to 30 min.

19. The process of claim 17 wherein said heating is at a temperature in the range of from 60° C. to 130° C. for a period of from 45 sec. to 30 min.

20. The process of claim 3 wherein said retentate produced in step (c) is heated at a temperature in the range of from 60° C. to 150° C. for a period sufficient to
 (i) improve the protein efficiency ratio of said retentate, or
 (ii) improve the functionality of said retentate as measured by sedimentation index, nitrogen solubility index, or emulsion stability index.

21. The process of claim 20 wherein said retentate is combined with additional nutritional ingredients before heating.

22. The process of claim 20 wherein said period is from 1 sec. to 30 min.

23. The process of claim 20 wherein said temperature is in the range of from 60° C. to 130° C. and said period is from 45 sec. to 30 min.

24. The process for preparing a liquid food product containing oilseed protein and oilseed fat wherein said oilseed protein constitutes the principle protein ingredient of said product which comprises combining said retentate produced by the process of claim 1 with other nutritional ingredients.

25. The process of claim 1 wherein said retentate produced in step (c) is dried.

26. The product produced by the process of claim 1.
27. The product produced by the process of claim 3.
28. The product produced by the process of claim 10.
29. The product produced by the process of claim 14.
30. The product produced by the process of claim 17.
31. The product produced by the process of claim 20.
32. The product produced by the process of claim 24.
33. The product produced by the process of claim 25.

* * * * *